US009213910B2

(12) United States Patent
Burry et al.

(10) Patent No.: US 9,213,910 B2
(45) Date of Patent: Dec. 15, 2015

(54) REINFORCEMENT LEARNING APPROACH TO CHARACTER LEVEL SEGMENTATION OF LICENSE PLATE IMAGES

(71) Applicant: Xerox Corporation, Norwalk, CT (US)

(72) Inventors: Aaron Michael Burry, Ontario, NY (US); Farnaz Abtahi, Fort Lee, NJ (US)

(73) Assignee: Xerox Corporation, Norwalk, CT (US)

( * ) Notice: Subject to any disclaimer, the term of this patent is extended or adjusted under 35 U.S.C. 154(b) by 136 days.

(21) Appl. No.: 14/159,590

(22) Filed: Jan. 21, 2014

(65) Prior Publication Data

US 2015/0125041 A1     May 7, 2015

Related U.S. Application Data

(60) Provisional application No. 61/900,694, filed on Nov. 6, 2013.

(51) Int. Cl.
*G06K 9/32*     (2006.01)
*G06K 9/62*     (2006.01)

(52) U.S. Cl.
CPC .............. *G06K 9/325* (2013.01); *G06K 9/6256* (2013.01)

(58) Field of Classification Search
CPC ......... G06K 9/325; G06K 9/32; G06K 9/348; G06K 9/6256; G06K 2209/15; G06T 7/0079; G06T 7/0081; G06T 7/0087; G06T 2207/20081; G06T 2207/20112; G06T 2207/20116
See application file for complete search history.

(56) References Cited

U.S. PATENT DOCUMENTS

| | | |
|---|---|---|
| 5,862,259 A | 1/1999 | Bokser et al. ................. 382/228 |
| 6,473,517 B1 | 10/2002 | Tyan et al. .................... 382/105 |
| 6,553,131 B1 | 4/2003 | Neubauer et al. ............. 382/105 |
| 7,996,208 B2 | 8/2011 | Elbaz et al. ....................... 704/8 |
| 8,331,680 B2 | 12/2012 | Geva et al. .................... 382/182 |
| 8,429,097 B1 | 4/2013 | Sivasubramanian et al. ... 706/12 |
| 8,588,470 B2 | 11/2013 | Rodriguez Serrano et al. ............................. 382/105 |
| 2003/0074338 A1 | 4/2003 | Young et al. .................... 706/15 |
| 2011/0135156 A1 | 6/2011 | Chen et al. .................... 382/105 |
| 2011/0222769 A1 | 9/2011 | Galic et al. .................... 382/173 |
| 2012/0148105 A1 | 6/2012 | Burry et al. .................... 382/105 |
| 2013/0080358 A1 | 3/2013 | Newnham et al. .............. 706/12 |
| 2013/0084007 A1 | 4/2013 | Salamati et al. ............. 382/173 |
| 2013/0294652 A1 | 11/2013 | Fan et al. ...................... 382/105 |
| 2013/0294654 A1 | 11/2013 | Burry et al. ................... 382/105 |

FOREIGN PATENT DOCUMENTS

| | | | | |
|---|---|---|---|---|
| EP | 1 085 456 B1 | 11/2006 | ............... | G06K 9/34 |
| EP | 2 615 572 A1 | 7/2013 | ............... | G06K 9/34 |

*Primary Examiner* — Andrew W Johns
(74) *Attorney, Agent, or Firm* — Kermit D. Lopez; Luis M. Ortiz; Ortiz & Lopez, PLLC (57) ABSTRACT

Methods and systems for achieving accurate segmentation of characters with respect to a license plate image utilizing a reinforcement learning approach. A vehicle image can be captured by an image capturing unit and processed utilizing an ALPR (Automatic License Plate Recognition) unit. The reinforcement learning (RL) approach can be configured to initialize a segmentation agent with a starting location. A proper segmentation path (cuts) from top to bottom and from a darker to lighter area in a cropped license plate image can be identified by the segmentation agent during a training phase. Rewards can be provided based on a number of good and bad moves. The association between a current state and a sensory input with a preferred action can be learned by the segmentation agent at the end of the training phase.

20 Claims, 8 Drawing Sheets

REINFORCEMENT LEARNING APPROACH TO CHARACTER LEVEL SEGMENTATION OF LICENSE PLATE IMAGES

CROSS-REFERENCE TO PROVISIONAL APPLICATION

This application claims priority under 35 U.S.C. 119(e) to U.S. Provisional Patent Application Ser. No. 61/900,694, entitled "Reinforcement Learning Approach to Character Level Segmentation of License Plate Images," which was filed on Nov. 6, 2013, the disclosure of which is incorporated herein by reference in its entirety.

FIELD OF THE INVENTION

Embodiments are generally related to image-processing and character segmentation. Embodiments are also related to ALPR (Automatic License Plate Recognition) methods and systems. Embodiments are additionally related to reinforcement learning techniques. Embodiments are further related to the character segmentation of license plate images.

BACKGROUND

ALPR (Automatic License Plate Recognition) systems often function as the core module of "intelligent" transportation infrastructure applications. License plate recognition can be employed to identify a vehicle by automatically reading a license plate via image-processing and character recognition technology. A license plate recognition operation can be performed by locating the license plate in an image, segmenting the characters in the license plate, and performing an OCR (Optical Character Recognition) operation with respect to the characters identified. In order for OCR to achieve a high accuracy, it is necessary to obtain properly segmented characters.

Several approaches have been implemented for performing character segmentation on license plate images. One approach involves the use of a vertical projection histogram to produce character boundaries (cuts) and local statistical information, such as a median character spacing, to split a large cut (caused by combining characters) and to insert a missing character. Such operations require minimal computational resources and consequently applied to each input image to achieve good character segmentation accuracy. Also, such an approach utilizes a priori image information, thereby enabling robust performance over a variety of state logos, fonts, and character spacing.

Figure 1:
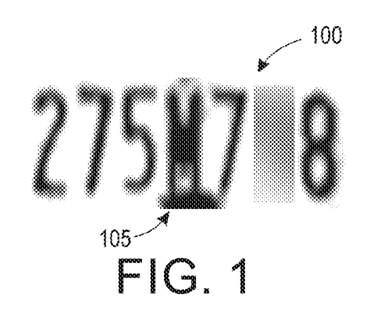
FIGS. 1-3 illustrate a prior art license plate image depicting character segmentation problem(s) that may be encountered in determining segmentation boundaries.
Figure 2:
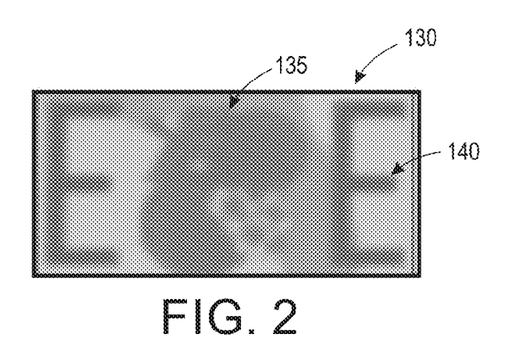

A problem associated with such projective segmentation techniques is substantial variation across the plate in the regions surrounding the characters. For example, consider the cropped license plate image 100 depicted in FIG. 1. A partial obstruction 105 near the center of the plate 100 clearly represents a different local challenge as compared to other inter-character regions on the plate 100. FIG. 2 represents a license plate image 130 having a complex background pictorial 135. The projective segmentation approach failed to identify the segmentation boundaries between the pictorial 135 and the characters 140 on either side.

Figure 3:
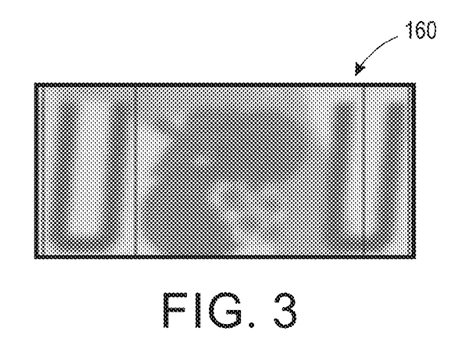

The complex background pictorial 135 also presents a local variation and cannot be easily overcome with a fixed segmentation threshold. Adjusting the aggressiveness of the threshold for the projective segmentation approach can help to prevent the missed cuts. Such approach often, however, leads to over-segmentation of images, as depicted in FIG. 3. Hence, it is often extremely difficult to determine the right threshold setting in order to reduce the under-segmentation event (missed cuts) without inducing unwanted over-segmentation event (split characters) across a large number of license plate images.

Based on the foregoing, it is believed that a need exists for an improved character segmentation method and system for a license plate image utilizing a reinforcement learning approach, as will be described in greater detail herein.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved ALPR (Automatic License Plate Recognition) methods and systems.

It is another aspect of the disclosed embodiments to provide for an improved character segmentation method and system.

It is a further aspect of the disclosed embodiments to provide for an improved reinforcement learning approach for efficiently achieving accurate segmentation of characters.

The aforementioned aspects and other objectives and advantages can now be achieved as described herein. A system and method for achieving accurate segmentation of characters with respect to a license plate image utilizing a reinforcement learning approach is disclosed herein. A vehicle image can be captured by an image capturing unit and processed utilizing an ALPR (Automatic License Plate Recognition) unit. The reinforcement learning (RL) approach can be configured to initialize a segmentation agent with a starting location. A proper segmentation path (cuts) from top to bottom and from a darker to lighter area in a cropped license plate image can be identified by the segmentation agent during a training phase. Rewards can be provided based on a number of good and bad moves. The association between a current state and a sensory input with a preferred action can be learnt by the segmentation agent at the end of the training phase. The association learnt in the training phase can be employed to traverse from the top to bottom of the license plate image by the segmentation agent at runtime. Such an approach improves robustness of the ALPR system and extends its operating latitude to include other application areas and reduced image capturing unit requirements.

The segmentation path (four possible move directions) from a certain point (pixel location) on the top border of a text area of the license plate image to the bottom border and from the darker to the lighter area can be performed with as few moves as possible, without entering the body of any of the characters. A neighborhood of size N×N can be employed as a "field of view" at any pixel location. A mean gray value of the neighborhood as seen in the potential move directions can be compared to that of neighborhood centered on a current pixel location. The segmentation path from light to dark and moving up is considered a bad move, while the segmentation path from dark to light or staying in a light region or moving down is rewarded.

The agent can draw the segmentation path starting at every possible pixel location in the top row of the image. A projective segmentation can also be employed to provide the starting location for the reinforcement learning approach. The projective segmentation can be performed with a larger than normal threshold with the reinforcement learning agent-based segmentation identifying cuts that are deemed invalid. The segmentation path can be terminated prior to reaching the bottom of the image if the reinforcement learning approach gets stuck as the agent is limited in the number of moves. Any pathway for which the agent fails to reach the bottom of the image can then be discarded. The character segmentation can also be performed utilizing a vertical projection histogram without prior information and is largely robust to the variation in character spacing caused by a state logo and a specialty designation.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the present invention can be embodied as a method, data processing system, or computer program product. Accordingly, the present invention may take the form of an entire hardware embodiment, an entire software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, USB flash drives, DVDs, CD-ROMs, optical storage devices, magnetic storage devices, etc.

Computer program code for carrying out operations of the present invention may be written in an object oriented programming language (e.g., JAVA, C++, etc.). The computer program code, however, for carrying out operations of the present invention may also be written in conventional procedural programming languages such as the "C" programming language or in a visually oriented programming environment such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, WiMax, 802.11x, and cellular network or the connection can be made to an external computer via most third party supported networks (e.g., through the Internet via an Internet service provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 4:
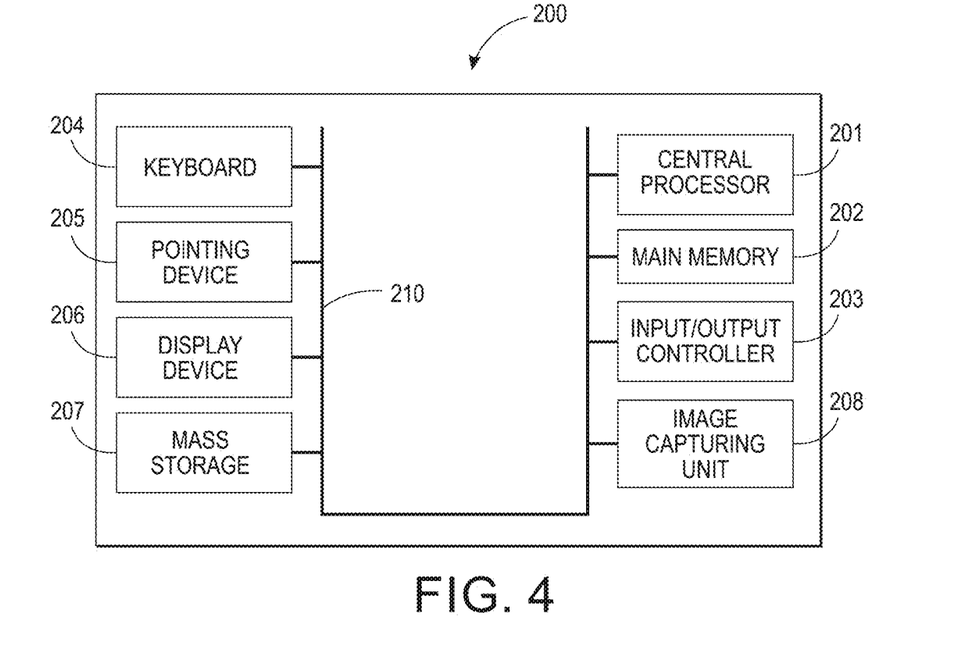
FIG. 4 illustrates a schematic view of a computer system, in accordance with the disclosed embodiments.
Figure 5:
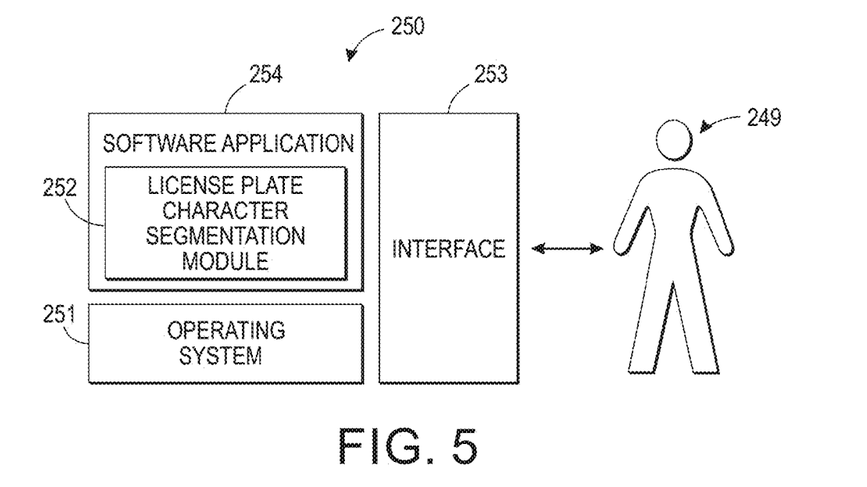
FIG. 5 illustrates a schematic view of a software system including a license plate character segmentation module, an operating system, and a user interface, in accordance with a possible embodiment.

FIGS. 4-5 are provided as exemplary diagrams of data-processing environments in which embodiments of the present invention may be implemented. It should be appreciated that FIGS. 4-5 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 4, the disclosed embodiments may be implemented in the context of a data-processing system 200 that includes, for example, a central processor 201, a main memory 202, an input/output controller 203, a keyboard 204, an input device 205 (e.g., a pointing device such as a mouse, track ball, and pen device, etc.), a display device 206, a mass storage 207 (e.g., a hard disk), and an image capturing unit 208. As illustrated, the various components of data-processing system 200 can communicate electronically through a system bus 210 or similar architecture. The system bus 210 may be, for example, a subsystem that transfers data between, for example, computer components within data-processing system 200 or to and from other data-processing devices, components, computers, etc.

FIG. 5 illustrates a computer software system 250 for directing the operation of the data-processing system 200 depicted in FIG. 4. Software application 254, stored in main memory 202 and on mass storage 207, generally includes a kernel or operating system 251 and a shell or interface 253. One or more application programs, such as software application 254, may be "loaded" (i.e., transferred from mass storage 207 into the main memory 202) for execution by the data-processing system 200. The data-processing system 200 receives user commands and data from a user 249 through user interface 253; these inputs may then be acted upon by the data-processing system 200 in accordance with instructions from operating system module 252 and/or software application 254.

The following discussion is intended to provide a brief, general description of suitable computing environments in which the system and method may be implemented. Although not required, the disclosed embodiments will be described in the general context of computer-executable instructions such as program modules being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 253, which is preferably a graphical user interface (GUI), also serves to display results, whereupon the user 249 may supply additional inputs or terminate the session. In an example embodiment, operating system 251 and interface 253 can be implemented in the context of a "Windows" system. It can be appreciated, of course, that other types of systems are possible. For example, rather than a traditional "Windows" system, other operation systems such as, for example, Linux may also be employed with respect to operating system 251 and interface 253. The software application 254 can include a license plate character segmentation module 252 for achieving accurate segmentation of characters with respect to a license plate image utilizing a reinforcement learning approach. Software application 254, on the other hand, can include instructions, such as, for example, the instructions illustrated at blocks 810, 815, 820, 825, 830, 835, 840, 845, 850, and 855 of the method 800 depicted in FIG. 16.

FIGS. 4-5 are thus intended as examples and not as architectural mitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

Figure 6:
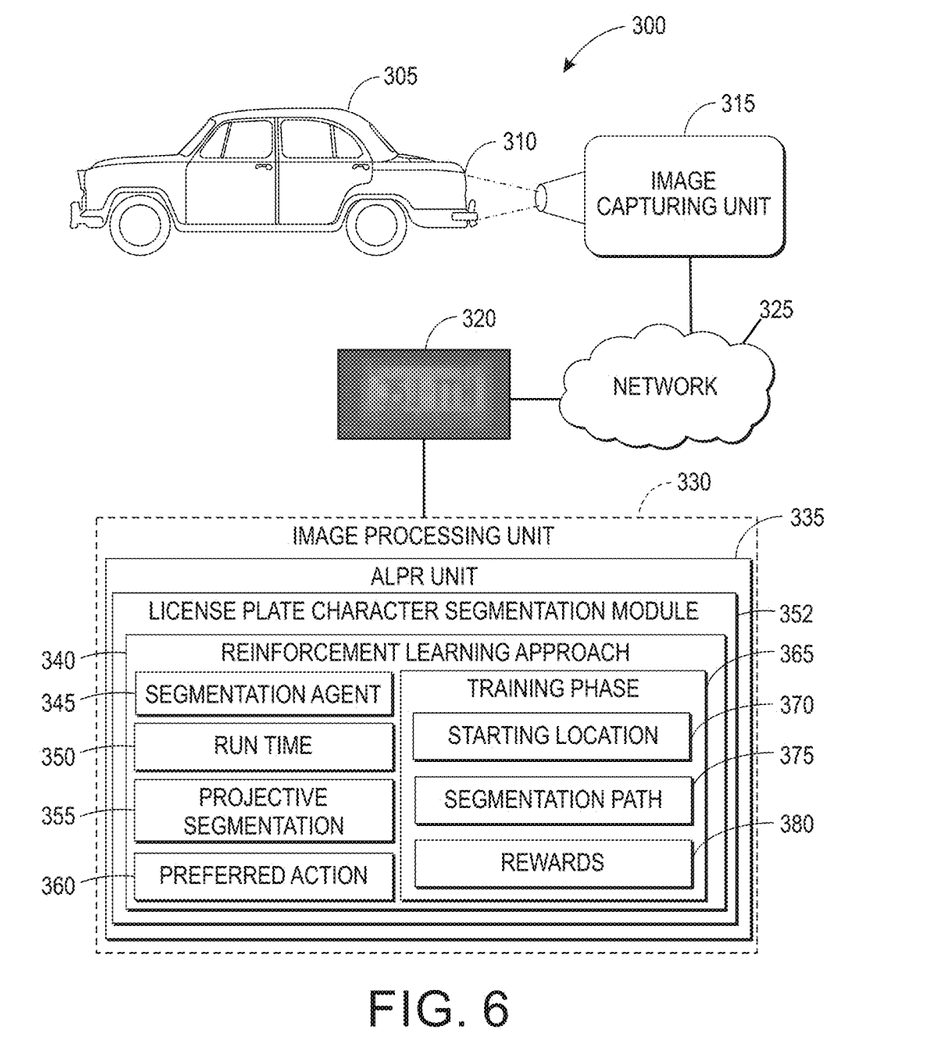
FIG. 6 illustrates a block diagram of a license plate character segmentation system based on reinforcement learning approach, in accordance with the disclosed embodiments.

FIG. 6 illustrates a block diagram of a license plate character segmentation system 300 based on reinforcement learning approach 340, in accordance with the disclosed embodiments. Note that in FIGS. 1-16, identical or similar blocks are generally indicated by identical reference numerals. The system 300 enhances the performance of automated license plate recognition (ALPR), which is a special form of optical character recognition (OCR). License plate recognition is a type of technology, mainly software, that enables a computer system to read automatically a registration number (license number) of vehicles 305 from a digital picture. Reading automatically the registration number means transforming the pixels of a digital image into an ASCII text of a number plate.

The license plate character segmentation system 300 generally includes an image capturing unit 315 (e.g., camera) for capturing an image of a vehicle 305 within an effective field of view. The image capturing unit 315 can be operatively connected to an image processing unit 330 via a network 325. Note that the image capturing unit 315 described in greater detail herein are analogous or similar to the image capturing unit 108 of the data-processing system 200, depicted in FIG. 4. The image-capturing unit 315 may include built-in integrated functions such as image processing, data formatting, and data compression functions. Also, the unit 315 includes imager-positioning, range-finding, and a flash bulb.

Note that the network 325 may employ any network topology, transmission medium, or network protocol. The network 325 may include connections such as wire, wireless communication links, or fiber optic cables. Network 325 can also be an Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages.

The image capturing unit 315 integrated with the image processing unit 330 continuously monitors traffic within an effective field of view. The image processing unit 330 receives the captured image from the image capturing unit 315 in order to process the image. The image processing unit 330 is preferably a small, handheld computer device or palmtop computer as depicted in FIG. 4 that provides portability and is adapted for easy mounting. The image capturing unit 315 captures multiple images (e.g., front and rear license plate images) as the vehicle 305 passes through an observation zone and the image processing unit 330 processes each image utilizing the license plate character segmentation module 352.

The image processing unit 330 can be configured to include the license plate character segmentation module 352 integrated with an automated license plate recognition unit 335 to accurately locate a license plate 310 of the vehicle 305. Note that the license plate recognition unit 335 is capable of reading the license plate 310 on the front of the vehicle 305 as well as the rear. An image of the vehicle 305 can be captured by the image-capturing unit 315 and processed utilizing the ALPR unit 335.

A reinforcement learning (RL) approach 340 can be configured to initialize a segmentation agent 345 with respect to a starting location 370. In general, reinforcement learning is an area of machine learning in computer science, concerned with how software agents ought to take actions in an environment so as to maximize some notion of cumulative reward. The segmentation agent 345 identifies a proper segmentation path 375 (e.g., cuts) from top to bottom and from a darker to lighter area in a cropped license plate image 320 during a training phase 365. The reinforcement learning (RL) approach 340 provides a reward 380 based on a number of good and bad moves. At the end of the train phase 365, the segmentation agent 345 can "learn" the association between the current state and its sensory input with a preferred action 360. At runtime 350, the segmentation agent 345 utilizes the associations learned in the training phase 365 to traverse from the top to bottom of a given license plate image 320.

Figure 7:
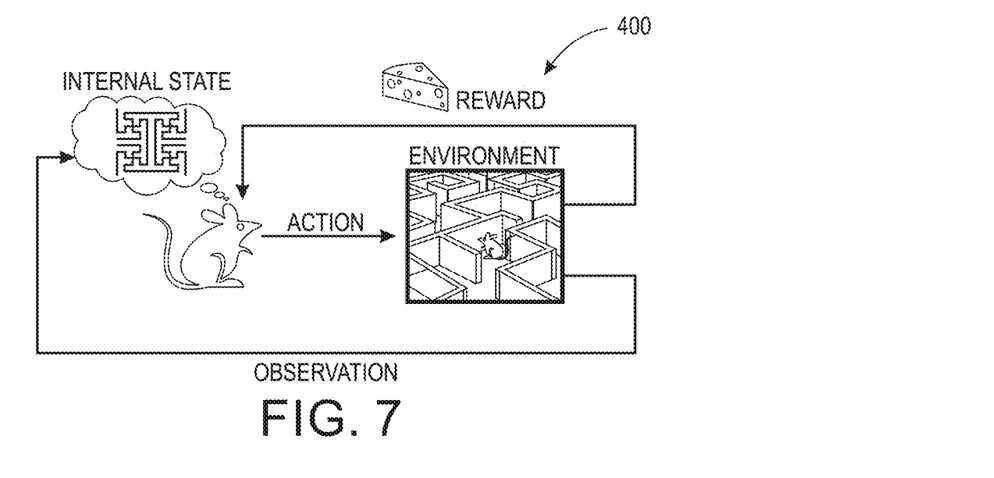
FIG. 7 illustrates a block diagram of a reinforcement learning system, in accordance with the disclosed embodiments.

FIG. 7 illustrates a block diagram of a reinforcement learning system 400, in accordance with the disclosed embodiments. The system 300 utilizes the reinforcement learning (RL) approach 340 to identify the segmentation paths 375 (cuts) from top to bottom in the cropped license plate image 320. For example, the reinforcement learning system 400 can revolve around an agent such as the segmentation agent 345 interacting with a particular environment. At any given state, such an agent can select from a set of actions and transition to a new state based on the selected action 360. The combination of states and action will provide some level of reward (or punishment) to the agent. Over time, by interacting with the environment, the rewards 380 and/or punishments reinforce desirable behaviors, those that provide the most long-term reward.

Figure 8:
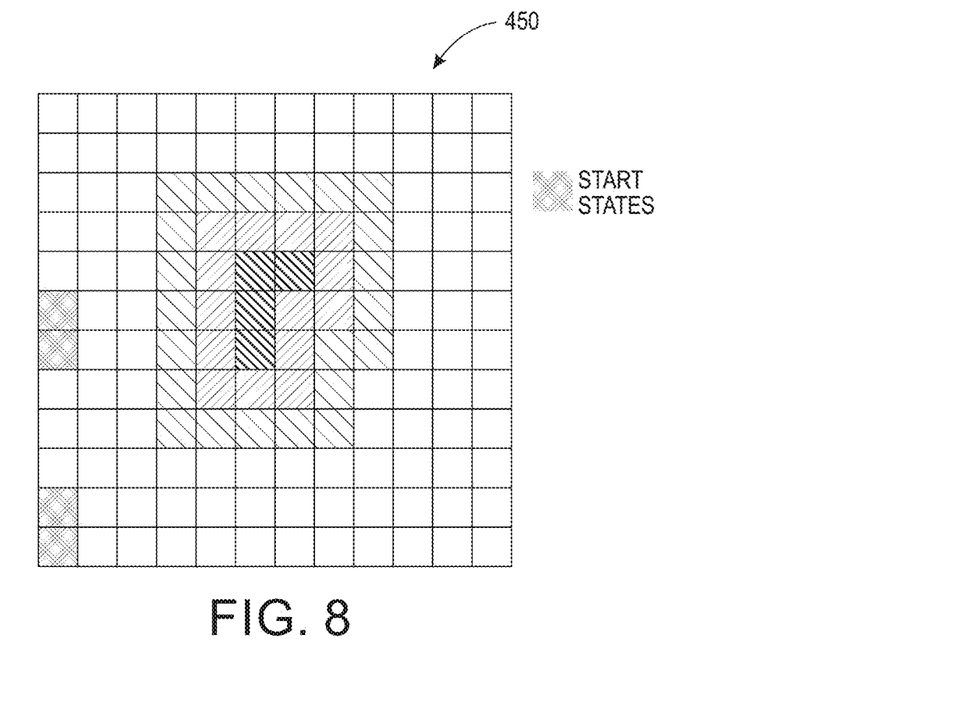
FIG. 8 illustrates a graphical representation of a puddle world, in accordance with the disclosed embodiments.
Figure 9:
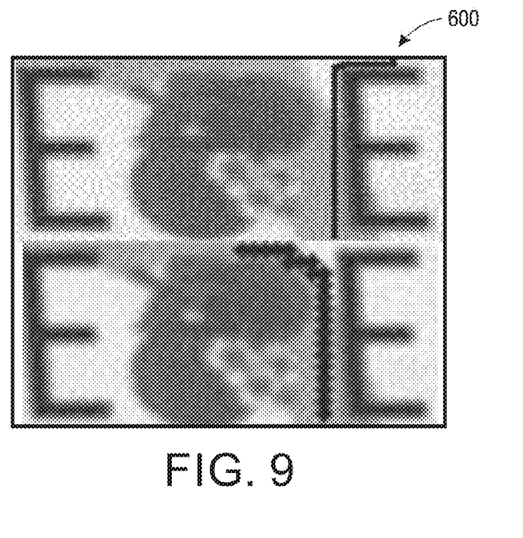
FIGS. 9-15 illustrate a license plate image depicting character segmentation based on the reinforcement learning approach, in accordance with the disclosed embodiments.
Figure 10:
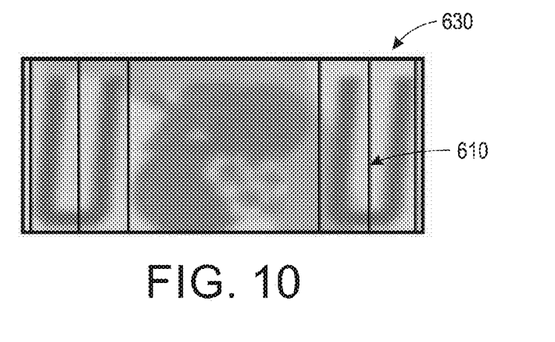
Figure 11:
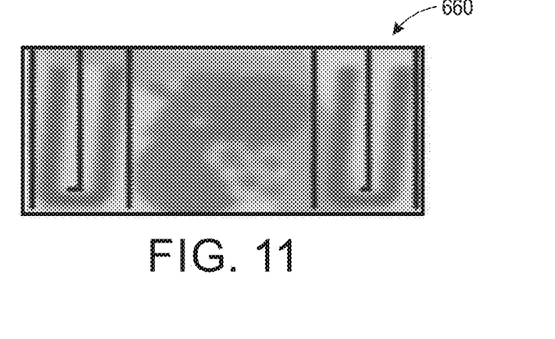
Figure 12:
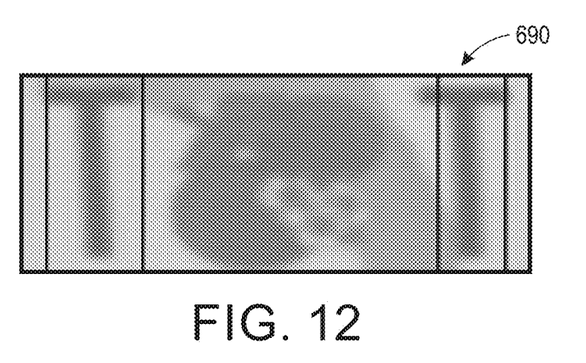
Figure 13:
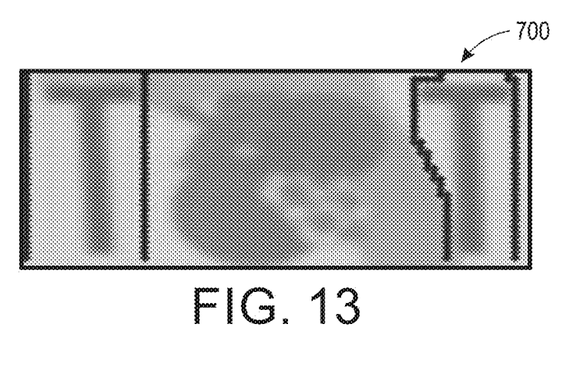
Figure 14:
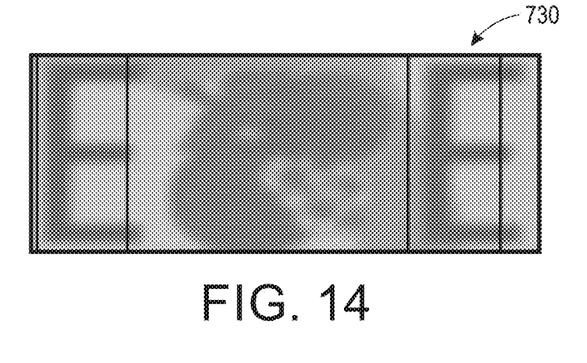
Figure 15:
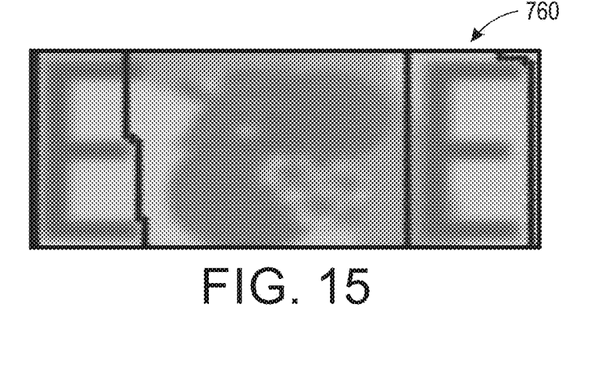

FIG. 8 illustrates a graphical representation of a puddle world 450, in accordance with the disclosed embodiments. The character segmentation can be considered to be an extended version of the puddle world 450. The scenario of FIG. 8 (deeper areas of the puddle are marked with darker color) can be considered starting from one of the start states; the goal is to reach a certain position in shortest time, while avoiding the puddle as much as possible. The more one enters the puddle (darker areas), the larger the cost of the move and the entire path will be.

For example, the license plate character segmentation module 352 is setup in a similar fashion. The characters can be counted as puddles and are to be avoided. Starting from a certain point on the top border of a text area of the license plate 310, the goal is to reach the bottom border as soon as possible without entering the body of any of the characters. Moving from a dark area (potentially a character) to a lighter area is always preferred. Starting from a point (e.g., pixel) on the top border of the license plate image 320, four moves are possible such as up, down, right, and left. A neighborhood of size N×N pixels, for example, can be employed as a "field of view". A mean gray value of the neighborhood as seen looking in the four possible move directions can be compared to that of the neighborhood centered on the current pixel location. Since characters can be typically seen as dark on lighter backgrounds, the reward 380 can be defined such that moving from light to dark can be considered as a bad move, while moving from dark to light or staying in a light region can be good. In addition, attempting to draw segmentation cuts from top to bottom, moving down can be preferred (rewarded) over moving up (punished).

During the training phase 365, the segmentation agent 345 attempts to traverse from the top of the license plate image 320 to the bottom. Rewards 380 can be provided according to the number of good and bad moves. At the end of training, the segmentation agent 345 learned to associate its current state and its "sensory input" (based on each of the four possible move directions) with the preferred action 360. At runtime 350, the RL segmentation agent 345 utilizes the associations learned in the training phase 365 to traverse from the top to bottom of a given license plate image 320. The RL approach 340 can be much more robust to local variations in background gray value than existing projective segmentation 355 techniques.

The RL approach 340 outlined above requires that the segmentation agent 345 be initialized to the starting location 370. The segmentation agent 345 can draw segmentation paths 375 starting at every possible pixel location in the top row of the image 320. The projective segmentation module 355 can also be employed to provide seed locations for the RL approach 340. In particular, the projective segmentation module 355 can be performed/implemented with a larger than normal threshold. In the projective segmentation module 355, any column whose normalized vertical sum is less than the threshold is a candidate cut.

Thus, the higher than normal threshold means that the method will tend to over-segment the image. The RL approach 340 then serves to screen off unwanted segmentation cuts that are deemed invalid. Such a hybrid approach leverages the speed and simplicity of the projective segmentation module 355 along with the power of the RL approach 340. The RL segmentation agent 345 can be limited in the number of moves that it is allowed to make. In this way, the segmentation path 375 can be terminated prior to reaching the bottom of the image if the RL approach 340 gets stuck. Any pathways for which the segmentation agent 345 fails to reach the bottom of the image can then be discarded.

FIGS. 9-15 illustrate the license plate images 600, 630, 660, 690, 700, 730, and 760 depicting character segmentation based on the reinforcement learning approach 340, in accordance with the disclosed embodiments. For example, in FIG. 11 the segmentation agent 345 may become stuck within the "well" of the U's as depicted by arrow 660. The segmentation agent 345 can be permitted to stay within the region 660 as an indication that a suitable segmentation path 375 cannot be found from the given starting location 370. FIGS. 9-15 illustrate examples of the initial projective segmentation results and the RL follow-on stage. The RL approach 340 determines appropriate segmentation paths and properly segments the complex backgrounds and partial obstructions as shown in FIGS. 9-15 to improve the robustness of the ALPR unit 335.

Figure 16:
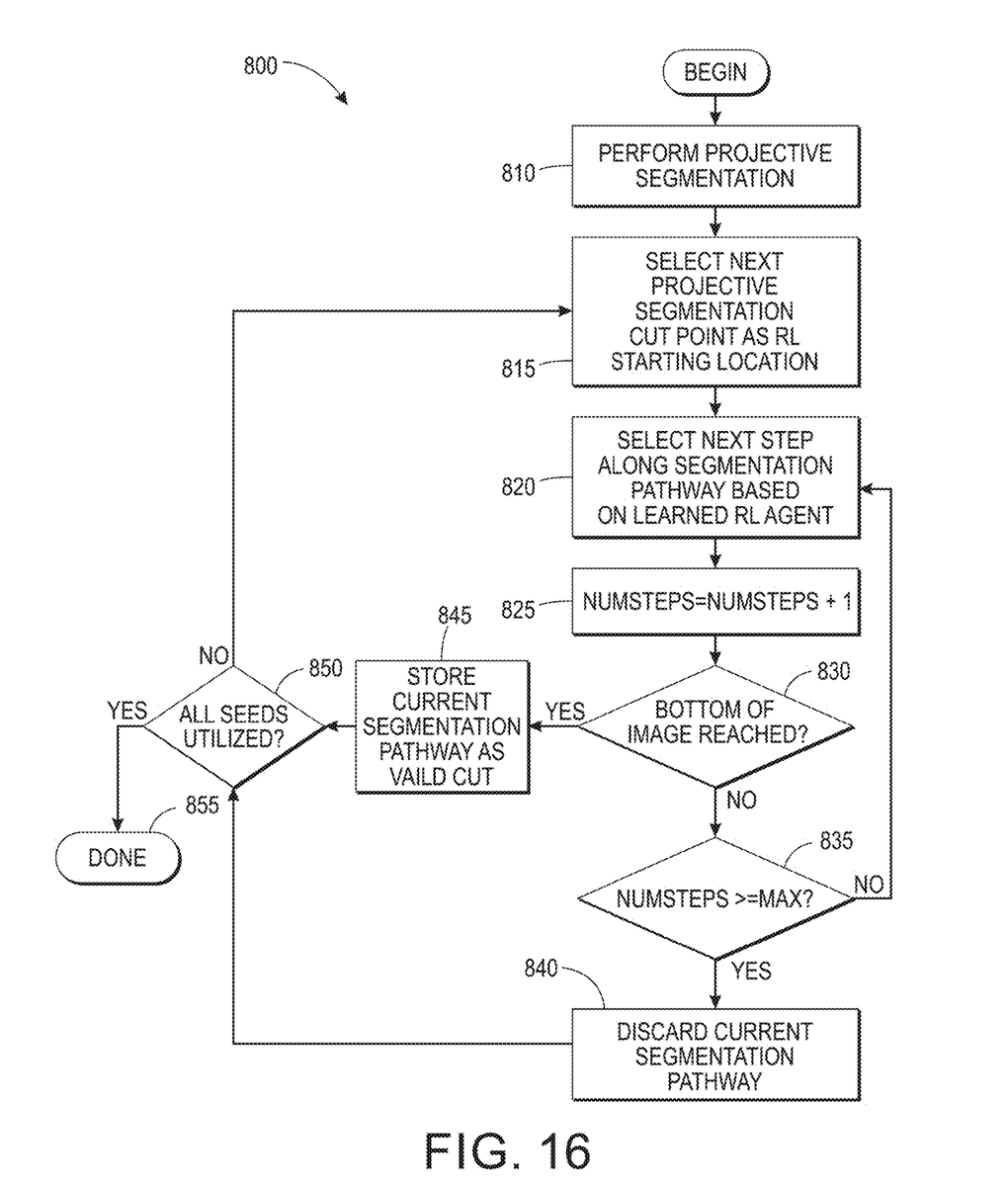
FIG. 16 illustrates a high level flow chart of operations illustrating logical operational steps of a method for achieving accurate segmentation of characters of the license plate image based on reinforcement learning approach, in accordance with the disclosed embodiments.

FIG. 16 illustrates a high level flow chart of operations illustrating logical operational steps of a method 800 for achieving accurate segmentation of characters of the license plate image 320 based on the reinforcement learning approach 340, in accordance with the disclosed embodiments. It can be appreciated that the logical operational steps shown in FIG. 16 can be implemented or provided via, for example, a module such as module 252 shown in FIG. 5 and can be processed via a processor such as, for example, the processor 201 shown in FIG. 4.

The projective segmentation 355 can be performed, as depicted at block 810. A next projective segmentation cut point can be selected as the reinforcement learning starting location 370, as described at block 815. The next step along the segmentation pathway can be selected based on the learned reinforcement learning segmentation agent 345, as shown at block 820. A numsteps can be equal to numsteps+1 can be executed, as illustrated at block 825. A determination can be made whether a bottom of image is reached, as described at block 830. If the bottom of image is reached, then a current segmentation pathway can be stored as a valid cut, as illustrated at block 845.

Thereafter, another determination can be made whether all seeds are employed, as mentioned at block 850. If all seeds are utilized, then the license plate character segmentation process can be done, as illustrated at block 855. If seeds are not utilized, then the next projective segmentation 355 cut point can be selected as RL starting location 370, as described at block 815. If the bottom of image is not reached, then a determination can be made whether numsteps is greater than are equal to maximum, as shown at block 835. If numsteps are greater than or equal to maximum, then a current segmentation pathway can be discarded, as depicted at block 840.

Thereafter, another determination can be made regarding whether all seeds are utilized, as described at block 850. If seeds are utilized, then the license plate character segmentation process can be completed, as illustrated at block 855. If seeds are not utilized, then the next projective segmentation 355 cut point can be selected as an RL starting location 370, as described at block 815. If numsteps are not greater than or equal to maximum, then the next step along the segmentation pathway can be selected based on the learned RL segmentation agent 345, as illustrated at block 820. Such an approach improves the robustness of the ALPR system and extends its operating latitude to include other application areas and reduced image capturing unit requirements.

Based on the foregoing, it can be appreciated that a number of embodiments, preferred and alternative, are disclosed herein. For example, accordance with one embodiment, a license plate character segmentation method can be implemented. Such a method can include steps or logical operations, such as, for example: initializing a segmentation agent in association with a starting location to identify a segmentation path in a license plate image by the segmentation agent during a training phase; automatically learning an association between a current state and a sensory input with a preferred action by the segmentation agent at an end of the training phase; and traversing from a top to a bottom of the license plate image by segmentation agent at runtime utilizing the association learned during the training phase to improve a robustness of license plate character segmentation and an operational latitude of an automatic license plate recognition unit.

In another embodiment, a step or logical operation can be provided for executing the segmentation path from a particular point on a top border thereof and from a darker area to a lighter area without entering a body of characters associated with the license plate image. In yet another embodiment, steps or logical operations can be provided for employing a pixel neighborhood of size N×N as a field of view; and comparing mean gray value of the neighborhood as seen in a potential move direction to that of a neighborhood centered on a current pixel location. In still another embodiment, a step or logical operation can be implemented for providing a reward to the segmentation agent during a training phase based on a number of good moves and bad moves.

In some embodiments, steps or logical operations can be implemented for evaluation the segmentation move from a current pixel location to a next pixel location; designation a move from a light region to a dark region and/or an upward move with respect to the license plate image as a bad move; and designating a move from a dark region to a light region and/or a downward move with respect to the license plate image as a good move.

In another embodiment, a step or logical operation can be provided for determining the segmentation path beginning with every possible pixel location in a top row of the license plate image by the segmentation agent. In some embodiments, a first segmentation to determine initial location for candidate segmentation paths to be evaluated by the segmentation agent can be implemented. In some embodiments, the aforementioned segmentation agent determines the validity of segmentation paths produced by the first segmentation. In another embodiment, the first segmentation can be composed of a protective segmentation with an appropriate threshold selected.

In another embodiment, a license plate character segmentation system can be implemented. Such a system can include, for example, a processor and a computer-usable medium embodying computer program code. The computer-usable medium can communicate electronically with the processor. The computer program code can include instructions executable by the processor and configured for: initializing a segmentation agent in association with a starting location to identify a segmentation path in a license plate image by segmentation agent during a training phase; automatically learning an association between a current state and a sensory input with a preferred action by the segmentation agent at an end of the training phase; and traversing from at top to a bottom of the license plate image by the segmentation agent at runtime utilizing the association learned during the training phase to improve a robustness of license plate character segmentation and an operational latitude of an automatic license plate recognition unit.

In another embodiment, such instructions can be further configured for executing the segmentation path from a particular point on a top border of a text area associated with the license plate image to a bottom border thereof and from a darker area to a lighter area without entering a body of characters associated with the license plate image. In still another embodiment, such instructions can be further configured for employing a pixel neighborhood of sixe N×N as a field of view; and comparing a mean gray value of the neighborhood as seen in a potential move direction to that of a neighborhood centered on a current pixel location.

In another embodiment, such instructions can be further configured for providing a reward to the segmentation agent during a training phase based on a number of good moves and bad moves. In still another embodiment, such instructions can be further configured for evaluating the segmentation move from a current pixel location to a next pixel location; designating a move from a light region to a dark region and/or an upward move with respect to the license plate image as a bad move; and designating a move from a dark region to a light region and/or a downward move with respect to the license plate image as a good move.

In another embodiment, such instructions can be further configured for determining the segmentation path beginning with every possible pixel location in a top row of the license plate image by the segmentation agent. In yet another embodiment, such instructions can be further configured for comprising a first segmentation to determine initial locations for candidate segmentation paths to be evaluated by the segmentation agent. In some embodiments, the segmentation agent can determine the validity of segmentation paths produced by the first segmentation. In yet another embodiment, the first segmentation can be composed of a projective segmentation with an appropriate threshold selected.

In another embodiment, a non-transitory processor-readable medium storage code representing instructions to cause a process for character segmentation can be implemented. Such a code can include code to initialize a segmentation agent in association with a starting location to identify a segmentation agent in association with a starting location to identify a segmentation path in a license plate image by the segmentation agent during a training phase; automatically learn an association between a current state and a sensory input with a preferred action by the segmentation agent at an end of the training phase; and traverse from a top to a bottom of the license plate image by the segmentation agent at runtime utilizing the association learned during the training phase to improve a robustness of license plate character segmentation and an operational latitude of an automatic license plate recognition unit.

In still another embodiment, such code can further include code to execute the segmentation path from a particular point on a top border of a text area associated with the license plate image to a bottom border thereof and from a darker area to a lighter area without entering a body of characters associated with the license plate image; employ a pixel neighborhood of size N×N as a field of view; and compare the mean gray value of the neighborhood as seen in a potential move direction to that of a neighborhood centered on a current pixel location.

It will be appreciated that variations of the above-disclosed and other features and functions, or alternatives thereof, may be desirably combined into many other different systems or applications. Also, it can be appreciated that various presently unforeseen or unanticipated alternatives, modifications, variations or improvements therein may be subsequently made by those skilled in the art which are also intended to be encompassed by the following claims.

The invention claimed is:

1. A license plate character segmentation method, said method comprising:
   initializing a segmentation agent in association with a starting location to identify a segmentation path in a license plate image by said segmentation agent during a training phase;
   automatically learning an association between a current state and a sensory input with a preferred action by said segmentation agent at an end of said training phase; and
   traversing from a top to a bottom of said license plate image by said segmentation agent at runtime utilizing said association learned during said training phase to improve a robustness of license plate character segmentation and an operational latitude of an automatic license plate recognition unit.

2. The method of claim 1 further comprising executing said segmentation path from a particular point on a top border of a text area associated with said license plate image to a bottom border thereof and from a darker area to a lighter area without entering a body of characters associated with said license plate image.

3. The method of claim 1 further comprising:
   employing a pixel neighborhood of size N×N as a field of view; and
   comparing a mean gray value of said neighborhood as seen in a potential move direction to that of a neighborhood centered on a current pixel location.

4. The method of claim 1 further comprising providing a reward to said segmentation agent during a training phase based on a number of good moves and bad moves.

5. The method of claim 4 further comprising:
   evaluating said segmentation move from a current pixel location to a next pixel location;
   designating a move from a light region to a dark region and/or an upward move with respect to said license plate image as a bad move; and
   designating a move from a dark region to a light region and/or a downward move with respect to said license plate image as a good move.

6. The method of claim 1 further comprising determining said segmentation path beginning with every possible pixel location in a top row of said license plate image by said segmentation agent.

7. The method of claim 1 further comprising a first segmentation to determine initial locations for candidate segmentation paths to be evaluated by said segmentation agent.

8. The method of claim 7 wherein said segmentation agent determines a validity of segmentation paths produced by said first segmentation.

9. The method of claim 7 wherein said first segmentation comprises a projective segmentation with an appropriate threshold selected.

10. A license plate character segmentation system, said system comprising:
    a processor; and
    a computer-usable medium embodying computer program code, said computer-usable medium capable of communicating with said processor, said computer program code comprising instructions executable by said processor and configured for:
        initializing a segmentation agent in association with a starting location to identify a segmentation path in a license plate image by said segmentation agent during a training phase;
        automatically learning an association between a current state and a sensory input with a preferred action by said segmentation agent at an end of said training phase; and
        traversing from a top to a bottom of said license plate image by said segmentation agent at runtime utilizing said association learned during said training phase to improve a robustness of license plate character segmentation and an operational latitude of an automatic license plate recognition unit.

11. The system of claim 10 wherein said instructions are further configured for executing said segmentation path from a particular point on a top border of a text area associated with said license plate image to a bottom border thereof and from a darker area to a lighter area without entering a body of characters associated with said license plate image.

12. The system of claim 10 wherein said instructions are further configured for:
    employing a pixel neighborhood of size N×N as a field of view; and comparing a mean gray value of said neighborhood as seen in a potential move direction to that of a neighborhood centered on a current pixel location.

13. The system of claim 10 wherein said instructions are further configured for providing a reward to said segmentation agent during a training phase based on a number of good moves and bad moves.

14. The system of claim 13 wherein said instructions are further configured for:
  evaluating said segmentation move from a current pixel location to a next pixel location;
  designating a move from a light region to a dark region and/or an upward move with respect to said license plate image as a bad move; and
  designating a move from a dark region to a light region and/or a downward move with respect to said license plate image as a good move.

15. The system of claim 10 wherein said instructions are further configured for determining said segmentation path beginning with every possible pixel location in a top row of said license plate image by said segmentation agent.

16. The system of claim 10 wherein said instructions are further configured for comprising a first segmentation to determine initial locations for candidate segmentation paths to be evaluated by said segmentation agent.

17. The method of claim 16 wherein said segmentation agent determines a validity of segmentation paths produced by said first segmentation.

18. The method of claim 16 wherein said first segmentation comprises a projective segmentation with an appropriate threshold selected.

19. A non-transitory processor-readable medium storing code representing instructions to cause a process for character segmentation, said code comprising code to:
  initialize a segmentation agent in association with a starting location to identify a segmentation path in a license plate image by said segmentation agent during a training phase;
  automatically learn an association between a current state and a sensory input with a preferred action by said segmentation agent at an end of said training phase; and
  traverse from a top to a bottom of said license plate image by said segmentation agent at runtime utilizing said association learned during said training phase to improve a robustness of license plate character segmentation and an operational latitude of an automatic license plate recognition unit.

20. The non-transitory processor-readable medium of claim 19 wherein said code further comprises code to:
  execute said segmentation path from a particular point on a top border of a text area associated with said license plate image to a bottom border thereof and from a darker area to a lighter area without entering a body of characters associated with said license plate image;
  employ a pixel neighborhood of size N×N as a field of view; and
  compare a mean gray value of said neighborhood as seen in a potential move direction to that of a neighborhood centered on a current pixel location.

* * * * *